United States Patent
Zhao

(10) Patent No.: US 11,632,580 B2
(45) Date of Patent: Apr. 18, 2023

(54) SYSTEMS AND METHODS FOR MULTI-VIDEO STREAM TRANSMISSION

(71) Applicant: ZHEJIANG DAHUA TECHNOLOGY CO., LTD., Zhejiang (CN)

(72) Inventor: Can Zhao, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/361,347

(22) Filed: Jun. 29, 2021

(65) Prior Publication Data

US 2021/0337255 A1    Oct. 28, 2021

Related U.S. Application Data

(63) Continuation of application No. PCT/CN2018/125763, filed on Dec. 29, 2018.

(51) Int. Cl.
  *H04N 21/262* (2011.01)
  *H04N 21/266* (2011.01)

(52) U.S. Cl.
  CPC ..... *H04N 21/26241* (2013.01); *H04N 21/266* (2013.01)

(58) Field of Classification Search
  None
  See application file for complete search history.

(56) References Cited

U.S. PATENT DOCUMENTS

| 8,526,505 B2 * | 9/2013 | Kim | H04N 21/64792 |
| | | | 375/240.26 |
| 9,031,138 B1 * | 5/2015 | Lewis | H04N 7/0806 |
| | | | 375/240.26 |

(Continued)

FOREIGN PATENT DOCUMENTS

| CN | 101888561 A | 11/2010 |
| CN | 102457727 A | 5/2012 |

(Continued)

OTHER PUBLICATIONS

The Extended European Search Report in European Application No. 18945241.0 dated Oct. 26, 2021, 12 pages.

(Continued)

*Primary Examiner* — An Son P Huynh
(74) *Attorney, Agent, or Firm* — Metis IP LLC

(57) ABSTRACT

The present disclosure relates to systems and methods for a multi-video stream transmission to a client terminal. The systems and methods may include obtaining a multi-video stream including a plurality of video streams, each video stream including multiple key frames characterized by a frame rate and a key frame interval. The systems and methods may include determining a delay time of an initial key frame for each video stream based on a plurality of frame rates and a plurality of key frame intervals of the plurality of video streams. The systems and methods may further include processing the plurality of video streams to determine a desired sending time of the initial key frame in the corresponding video streams based on the delay time of the initial key frame in each video stream. The systems and methods may further include transmitting the plurality of processed video streams to the client terminal.

18 Claims, 8 Drawing Sheets

(56) References Cited

U.S. PATENT DOCUMENTS

| | | | | |
|---|---|---|---|---|
| 10,219,014 B2* | 2/2019 | Van Dusen | ........ | H04N 21/2402 |
| 2002/0154238 A1* | 10/2002 | Hayashi | .................. | H04N 5/772 |
| | | | | 348/333.01 |
| 2003/0093801 A1* | 5/2003 | Lin | .................... | H04N 21/6587 |
| | | | | 386/E5.052 |
| 2005/0210145 A1* | 9/2005 | Kim | ................... | H04N 21/4788 |
| | | | | 709/219 |
| 2009/0282444 A1* | 11/2009 | Laksono | ............ | H04N 21/2387 |
| | | | | 725/89 |
| 2010/0295839 A1* | 11/2010 | Nagaya | .................... | H04N 5/63 |
| | | | | 345/212 |
| 2011/0153858 A1* | 6/2011 | Bae | .................... | H04N 21/2387 |
| | | | | 709/231 |
| 2011/0169952 A1* | 7/2011 | Yamaguchi | .......... | H04N 19/164 |
| | | | | 348/143 |
| 2011/0225315 A1* | 9/2011 | Wexler | .................. | H04L 65/762 |
| | | | | 709/231 |
| 2011/0246621 A1* | 10/2011 | May, Jr. | ................. | H04L 65/612 |
| | | | | 709/219 |
| 2013/0223812 A1 | 8/2013 | Rossi | | |
| 2013/0235937 A1* | 9/2013 | Sasaki | .................... | H04N 19/51 |
| | | | | 375/240.12 |
| 2014/0016693 A1* | 1/2014 | Zhang | .................. | H04N 19/513 |
| | | | | 375/E7.122 |
| 2014/0270338 A1* | 9/2014 | Zhao | ..................... | G06T 1/0071 |
| | | | | 382/100 |
| 2015/0036733 A1 | 2/2015 | Smadi et al. | | |
| 2016/0142750 A1* | 5/2016 | Huber | ................ | H04N 21/4302 |
| | | | | 725/116 |
| 2017/0251284 A1* | 8/2017 | Chou | ............... | H04N 21/23418 |
| 2017/0264866 A1 | 9/2017 | Li et al. | | |
| 2018/0054649 A1 | 2/2018 | Li et al. | | |
| 2021/0044778 A1 | 2/2021 | Wang | | |

FOREIGN PATENT DOCUMENTS

| | | |
|---|---|---|
| CN | 104574481 A | 4/2015 |
| CN | 104918133 A | 9/2015 |
| CN | 105338422 A | 2/2016 |
| CN | 105576164 A | 5/2016 |
| CN | 103780907 B | 1/2018 |
| CN | 107623851 A | 1/2018 |

OTHER PUBLICATIONS

International Search Report in PCT/CN2018/125763 dated Aug. 12, 2019, 4 pages.
Written Opinion in PCT/CN2018/125763 dated Aug. 12, 2019, 5 pages.

* cited by examiner

SYSTEMS AND METHODS FOR MULTI-VIDEO STREAM TRANSMISSION

CROSS-REFERENCE TO RELATED APPLICATIONS

This application is a Continuation of International Application No. PCT/CN2018/125763, filed on Dec. 29, 2018, the entire contents of which are hereby incorporated by reference.

TECHNICAL FIELD

The present disclosure relates to multimedia transmission techniques, and in particular, to systems and methods for multi-video stream transmission to achieve a balanced network load.

BACKGROUND

Multimedia contents (e.g., motion pictures, television broadcasts, movie playbacks, etc.) generally contain rich audio and video information, which are used in a variety of industries, such as education, entertainment, advertising, security, etc. Multimedia contents are often delivered to a client terminal through a transmission network or other delivery mechanism. In order to reduce the bandwidth needed to transmit the multimedia content(s), video data may be encoded into streamed video including frames, using one or more of a variety of compression schemes, such as moving picture experts group 2 or 4 (MPEG-2 or MPEG-4), H.261, H.263, H.264, H.265, etc. A video stream may include one or more key frames (e.g., inter-frame (I-frame)), one or more non-key frames (e.g., predictive frame (P-frame)), etc. An I-frame is encoded, e.g., by reducing the spatial redundancy in the picture, without referencing any other video frame. A P-frame is encoded by referring to other video frames (e.g., the preceding frames) to achieve a higher compression ratio. An I-frame is generally used as a reference frame, and provides a basis for decoding a P-frame. In general, the data amount of an I-frame is 8 to 10 times the data amount of a P-frame.

In video surveillance fields, a network video recorder (NVR) or a digital video recorder (DVR) is used to observe a plurality of scenes. That is, the NVR or DVR may request to pull a plurality of video streams corresponding to the plurality of scenes. Since the data amount of an I-frame is 8 to 10 times the data amount of a P-frame, if I-frames in different video streams are sent at the same time or at times close to each other, a network load peak rate may become excessively high, thus causing large network fluctuations or even exceeding a network load tolerance. Therefore, it is desirable to provide systems and method for multi-video stream transmission to achieve a balanced network load.

SUMMARY

In one aspect of the present disclosure, a system for multi-video stream transmission to a client terminal is provided. The system may include at least one storage device and at least one processor in communication with the at least one storage device. The at least one storage device may include a set of instructions. When executing the set of instructions, the at least one processor may be configured to cause the system to perform operations including obtaining a multi-video stream including a plurality of video streams. Each of the plurality of video streams may include multiple key frames characterized by a frame rate and a key frame interval. A key frame interval of a video stream may be a count of frames between two successive key frames in the video stream. The at least one processor may also be configured to cause the system to perform operations including determining a delay time of an initial key frame for each of the plurality of video streams based on a plurality of frame rates and a plurality of key frame intervals of the plurality of video streams, and processing the plurality of video streams to determine a desired sending time of the initial key frame in the corresponding video streams based on the delay time of the initial key frame in each of the plurality of video streams. The desired sending time of the initial key frame in a video stream may correspond to a time when the initial key frame of the video stream is sent to the client terminal. The at least one processor may be further configured to cause the system to perform operations including transmitting the plurality of processed video streams to the client terminal.

In some embodiments, to determine a delay time of an initial key frame for each of the plurality of video streams, the at least one processor may be configured to cause the system to perform additional operations including normalizing the plurality of key frame intervals to generate a plurality of normalized key frame intervals based on the plurality of frame rates and the plurality of key frame intervals, and determining the delay time of the initial key frame for each of the plurality of video streams based on the plurality of normalized key frame intervals.

In some embodiments, to normalize the plurality of key frame intervals, the at least one processor may be configured to cause the system to perform additional operations including determining a plurality of key frame interval times corresponding to the plurality of key frame intervals based on the plurality of corresponding frame rates, and determining a reference time based on the plurality of frame rates. A key frame interval time may be a time between the transmission of two successive key frames. The at least one processor may also be configured to cause the system to perform additional operations including determining the plurality of normalized key frame intervals based on the plurality of key frame interval times and the reference time.

In some embodiments, to determine the delay time of the initial key frame for each of the plurality of video streams, the at least one processor may be configured to cause the system to perform additional operations including determining a greatest common divisor (GCD) of the plurality of normalized key frame intervals, and determining the delay time of the initial key frame for each of the plurality of video streams based on the reference time and the GCD of the plurality of normalized key frame intervals.

In some embodiments, to determine the delay time of the initial key frame for each of the plurality of video streams, the at least one processor may be further configured to cause the system to perform additional operations including determining a lowest common multiple (LCM) of the plurality of normalized key frame intervals, and determining the delay time of the initial key frame for each of the plurality of video streams based on the reference time, the GCD, and the LCM of the plurality of normalized key frame intervals.

In some embodiments, to determine the delay time of the initial key frame for each of the plurality of video streams, the at least one processor may be further configured to cause the system to perform additional operations including ranking the plurality of normalized key frame intervals according to a predetermined rule, and determining the delay time of the initial key frame for each of the plurality of video streams based on the ranking.

In some embodiments, the at least one processor may be further configured to cause the system to perform additional operations including performing one or more iterations. Each of the one or more iterations may include determining whether at least two same normalized key frame intervals exist among the plurality of normalized key frame intervals; in response to a determination that at least two same normalized key frame intervals exist, determining a modified key frame interval based on the at least two same normalized key frame intervals; and updating the plurality of normalized key frame intervals by replacing at least one of the at least two same normalized key frame intervals by the modified key frame interval.

In some embodiments, the at least one processor may be further configured to cause the system to perform additional operations including determining whether at least two same normalized key frame intervals exist among the plurality of normalized key frame intervals; and in response to a determination that there is no same normalized key frame interval among the plurality of normalized key frame intervals, terminating the one or more iterations.

In some embodiments, to determine the delay time of the initial key frame for each of the plurality of video streams, the at least one processor may be further configured to cause the system to perform additional operations including determining a delay time of an initial key frame corresponding to each of the plurality of updated key frame intervals based on the plurality of updated normalized key frame intervals. For the at least two same normalized key frame intervals, the at least one processor may be further configured to cause the system to perform additional operations including determining a relative delay time of an initial key frame corresponding to each of the at least two same normalized key frame intervals, and determining a delay time of an initial key frame corresponding to each of the at least two same normalized key frame intervals based on a delay time of an initial key frame corresponding to the modified key frame interval and the relative delay time of the corresponding initial key frame.

In some embodiments, the at least one processor may be further configured to cause the system to perform additional operations including normalizing the delay time of the initial key frame in each of the plurality of video streams.

In some embodiments, to process the plurality of video streams, the at least one processor may be further configured to perform additional operations including at least one of: recoding at least one of the plurality of video streams; adding a key frame in at least one of the plurality of video streams; or postponing transmission of at least one of the plurality of video streams.

In some embodiments, the at least one processor may be further configured to cause the system to perform additional operations including receiving a user request to pull the plurality of video streams from the client terminal.

In another aspect of the present disclosure, a method for a multi-video stream transmission to a client terminal is provided. The method may be implemented on a computing device having at least one processor, at least one computer-readable storage medium, and a communication platform connected to a network. The method may include obtaining a multi-video stream including a plurality of video streams. Each of the plurality of video streams may include multiple key frames characterized by a frame rate and a key frame interval. A key frame interval of a video stream may be a count of frames between two successive key frames in the video stream. The method may also include determining a delay time of an initial key frame for each of the plurality of video streams based on a plurality of frame rates and a plurality of key frame intervals of the plurality of video streams, and processing the plurality of video streams to determine a desired sending time of the initial key frame in the corresponding video streams based on the delay time of the initial key frame in each of the plurality of video streams. The desired sending time of the initial key frame in a video stream may correspond to a time when the initial key frame of the video stream is sent to the client terminal. The method may further include transmitting the plurality of processed video streams to the client terminal.

In another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform operations including obtaining a multi-video stream including a plurality of video streams, each of the plurality of video streams including multiple key frames characterized by a frame rate and a key frame interval, a key frame interval of a video stream being a count of frames between two successive key frames in the video stream; determining, based on a plurality of frame rates and a plurality of key frame intervals of the plurality of video streams, a delay time of an initial key frame for each of the plurality of video streams; processing, based on the delay time of the initial key frame in each of the plurality of video streams, the plurality of video streams to determine a desired sending time of the initial key frame in the corresponding video streams, the desired sending time of the initial key frame in a video stream corresponding to a time when the initial key frame of the video stream is sent to a client terminal; and transmitting, to the client terminal, the plurality of processed video streams.

In another aspect of the present disclosure, a system for a multi-video stream transmission to a client terminal is provided. The system may include an acquisition module configured to obtain a multi-video stream including a plurality of video streams. Each of the plurality of video streams may include multiple key frames characterized by a frame rate and a key frame interval. A key frame interval of a video stream may be a count of frames between two successive key frames in the video stream. The system may also include a determination module configured to determine a delay time of an initial key frame for each of the plurality of video streams based on a plurality of frame rates and a plurality of key frame intervals of the plurality of video streams. The system may further include a processing module configured to process the plurality of video streams to determine a desired sending time of the initial key frame in the corresponding video streams based on the delay time of the initial key frame in each of the plurality of video streams. The desired sending time of the initial key frame in a video stream may correspond to a time when the initial key frame of the video stream is sent to the client terminal. The system may further include a transmission module configured to transmit the plurality of processed video streams to the client terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
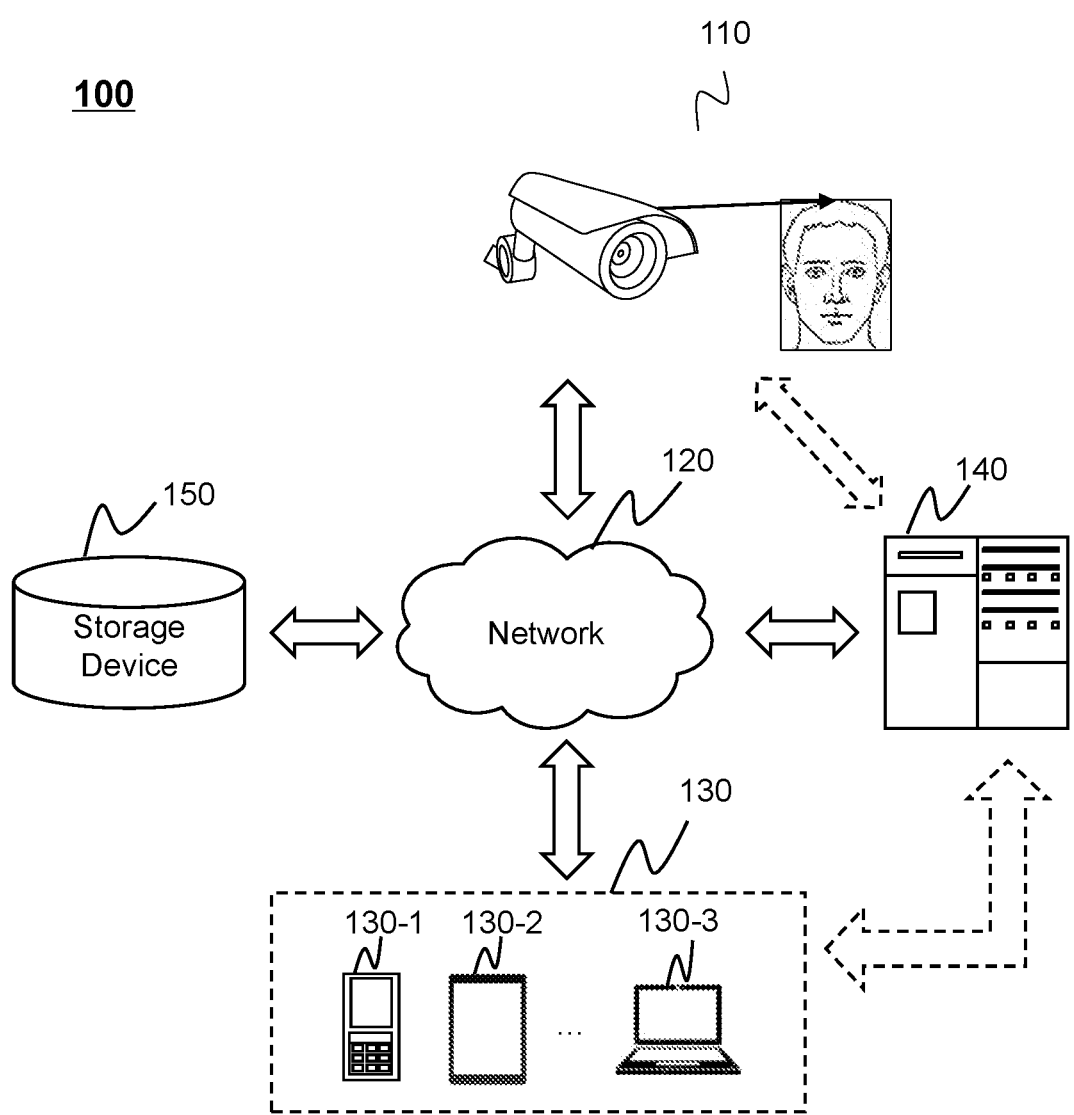
FIG. 1 is a schematic diagram illustrating an exemplary multimedia content processing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or another storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure relates to systems and methods for a multi-video stream transmission. The systems and methods may receive, from a client terminal (e.g., an NVR or a DVR), a user request to pull a plurality of video streams. The systems and methods may obtain a multi-video stream including the plurality of video streams. Each of the plurality of video streams may include multiple key frames characterized by a frame rate and a key frame interval. The frame rate of a video stream may refer to a count of frames displayed or transmitted per second. The key frame interval of a video stream may be a count of frames between two successive key frames in the video streams. In some embodiments, the key frame interval may be in the form of time, i.e., the time that lapses between two successive key frames. The systems and methods may also determine a delay time of an initial key frame for each of the plurality of video streams based on a plurality of frame rates and a plurality of key frame intervals of the plurality of video streams. The systems and methods may further process the plurality of video streams to determine a desired sending time of the initial key frame in the corresponding video streams based on the delay time of the initial key frame in each of the plurality of video streams. The desired sending time of the initial key frame in a video stream may correspond to a time when the initial key frame of the video stream is sent to the client terminal. The systems and methods may transmit the plurality of processed video streams to the client terminal. In some embodiments of the systems and methods of the present disclosure, the transmission times of the key frames in the plurality of video streams may be staggered, thus realizing a balanced network load.

The following descriptions are provided with reference to security surveillance where multiple scenes captured in a plurality of video streams are monitored. It is understood that this exemplary application is for illustration purposes and not intended to limit the scope of the present disclosure. The system and method disclosed herein may be used in fields other than security surveillance. For instance, the system and method may be used in a news room where multiple feeds including video streams are involved. The video streams may be generated according to, e.g., H.264 standard, H.265 standard, or the like. As another example, the system and method may be used in the transmission of one or more streams of data with periodicity. The one or more streams of data may include video data, audio data, image data, etc.

FIG. 1 is a schematic diagram illustrating an exemplary multimedia content processing system 100 according to some embodiments of the present disclosure. The multimedia content processing system 100 may be configured for synchronizing audio and video in multimedia contents. The multimedia content processing system 100 may include a capture device 110, a network 120, a terminal 130, a processing device 140, and a storage device 150. The components of the multimedia content processing system 100 may be connected to each other in one or more of various ways. Merely by way of example, as illustrated in FIG. 1, the capture device 110 may be connected to the processing device 140 via the network 120. As another example, the capture device 110 may be connected to the processing device 140 directly as indicated by the bi-directional arrow in dotted lines linking the capture device 110 and the processing device 140. As a further example, the storage device 150 may be connected to the processing device 140 directly or through the network 120. As still a further example, the terminal 130 may be connected to the processing device 140 directly (as indicated by the bi-directional arrow in dotted lines linking the terminal 130 and the processing device 140) or through the network 120.

The capture device 110 may be configured to capture one or more types of multimedia contents. The multimedia content(s) may include motion pictures, television broadcasts, movie playbacks, etc. The multimedia content(s) may include audio and/or video components. In order to reduce the bandwidth needed to transmit the multimedia content(s), the video component may be encoded into streamed video using one or more of a variety of compression schemes, such as moving picture experts group 2 or 4 (MPEG-2 or MPEG-4), H.261, H.263, H.264, H.265, etc. A video stream may include one or more key frames (e.g., inter-frame (I-frame)), one or more non-key frames (e.g., predictive frame (P-frame)), etc. The capture device 110 may be or include one or more cameras. In some embodiments, the capture device 110 may be a digital camera, a video camera, a security camera, a web camera, a smartphone, a tablet, a laptop, a video gaming console equipped with a web camera, a camera with multiple lenses, a camcorder, etc.

The network 120 may facilitate the exchange of information and/or data. In some embodiments, one or more components of the multimedia content processing system 100 (e.g., the capture device 110, the terminal 130, the processing device 140, the storage device 150) may send information and/or data to another component(s) in the multimedia content processing system 100 via the network 120. For example, the processing device 140 may process an image obtained from the capture device 110 via the network 120. As another example, the capture device 110 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the multimedia content processing system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, an Oculus Rift™, a HoloLens™, a Gear VR™, etc. In some embodiments, the terminal 130 may remotely operate the capture device 110. In some embodiments, the terminal 130 may operate the capture device 110 via a wireless connection. In some embodiments, the terminal 130 may receive information and/or instructions inputted by a user, and send the received information and/or instructions to the capture device 110 or to the processing device 140 via the network 120. In some embodiments, the terminal 130 may be part of the processing device 140. In some embodiments, the terminal 130 may be omitted.

In some embodiments, the processing device 140 may process data obtained from the capture device 110, the terminal 130, or the storage device 150. For example, the processing device 140 may obtain a multi-video stream including a plurality of video streams. As another example, the processing device 140 may determine a delay time of an initial key frame for each of the plurality of video streams. The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local to or remote from one or more other components of the multimedia content processing system 100. For example, the processing device 140 may access information and/or data stored in the capture device 110, the terminal 130, and/or the storage device 150 via the network 120. As another example, the processing device 140 may be directly connected to the capture device 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data and/or instructions. In some embodiments, the storage device 150 may store data or images obtained from the capture device 110, the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the multimedia content processing system 100 (e.g., the capture device 110, the terminal 130, the processing device 140). One or more components in the multimedia content processing system 100 may access the data or instructions stored in the storage device 150 via the network 120. In some embodiments, the storage device 150 may be directly connected to or communicate with one or more components in the multimedia content processing system 100 (e.g., the capture device 110, the terminal 130, the processing device 140). In some embodiments, the storage device 150 may be part of the capture device 110, or the processing device 140.

Figure 2:
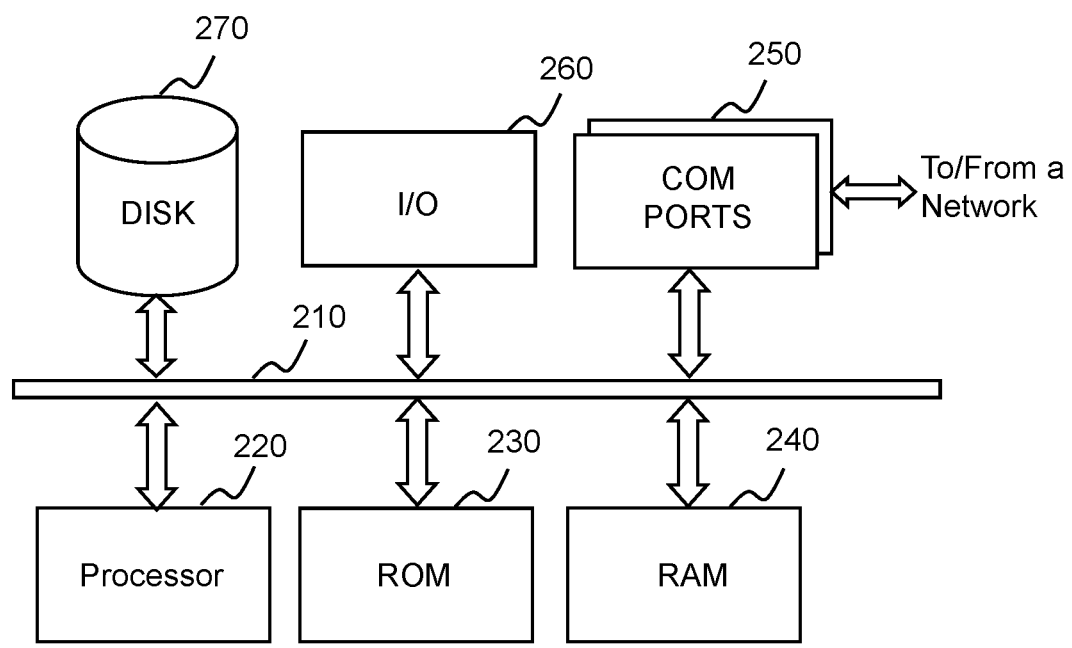
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the capture device 110, the terminal 130, the processing device 140 may be implemented on the computing device 200. For example, the processing device 140 may be implemented on the computing device 200 and configured to perform functions of the processing device 140 disclosed in this disclosure.

The computing device 200 may be a special purpose computer used to implement a multimedia content processing system for the present disclosure. The computing device 200 may be used to implement any component of the multimedia content processing system as described herein. For example, the processing device 140 may be implemented on the computing device, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or another type of non-transitory storage medium to be executed by the processor 220. The method and/or process of the present disclosure may be implemented as the program instructions. The computing device 200 also includes an I/O device 260 that may support the input and/or output of data flows between the computing device 200 and other components. The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes operation A and the second processor executes operation B, or the first and second processors jointly execute operations A and B).

Figure 3:
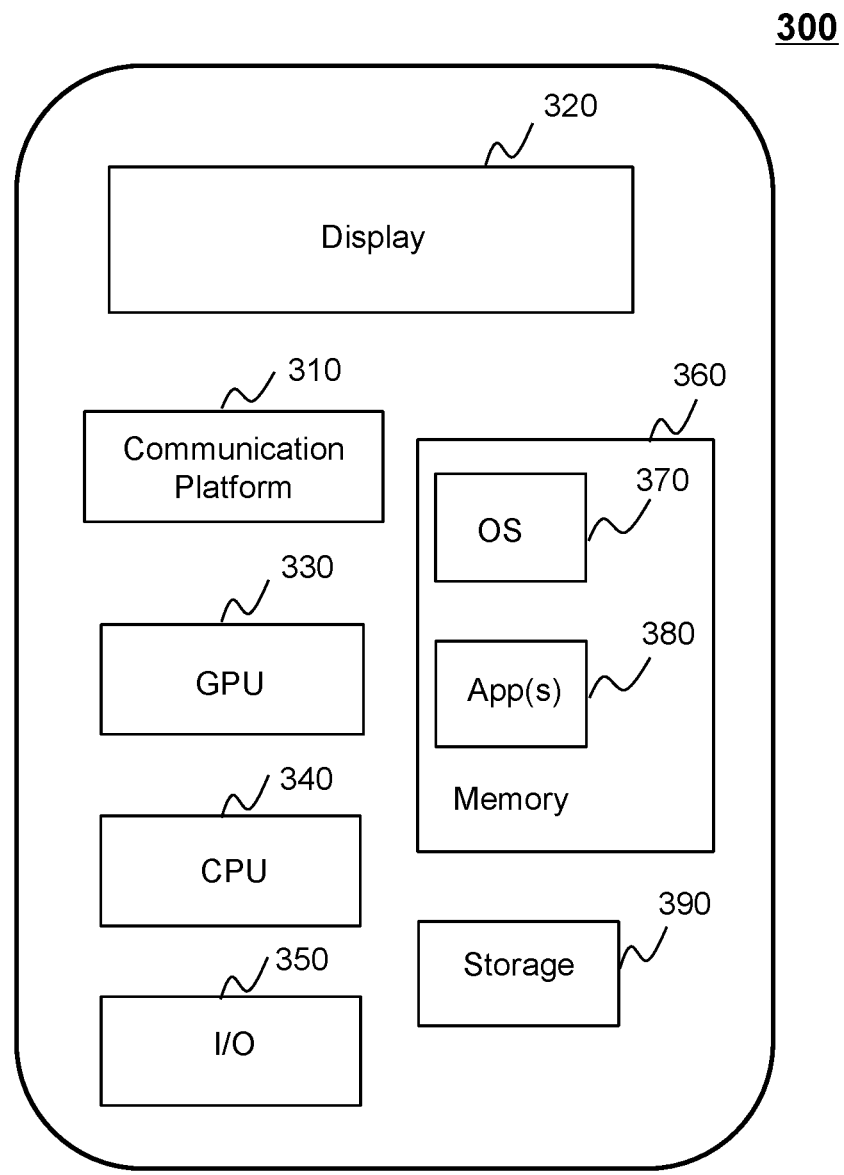
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the terminal 130. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300.

In some embodiments, an operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the multimedia content processing system 100. User interactions with the information stream may be achieved via the I/O 350 and provided to the storage device 150, the capture device 110 and/or other components of the multimedia content processing system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
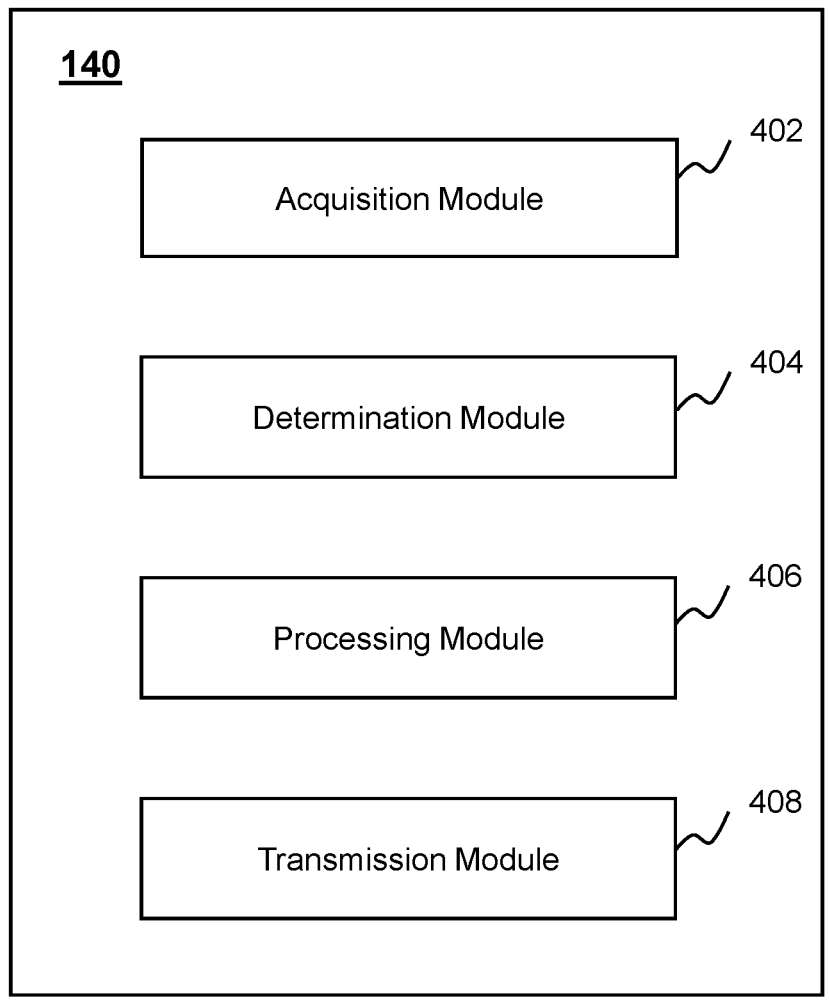
FIG. 4 is a block diagram illustrating an exemplary processing device according to some embodiments of the present disclosure.

FIG. 4 is a block diagram illustrating an exemplary processing device according to some embodiments of the present disclosure. The processing device 140 may include an acquisition module 402, a determination module 404, a processing module 406, and a transmission module 408. The modules may be hardware circuits of all or part of the processing device 140. The modules may also be implemented as an application or a set of instructions read and executed by the processing device 140. Further, the modules may be any combination of the hardware circuits and the application/instructions. For example, the modules may be the part of the processing device 140 when the processing device 140 is executing the application/set of instructions.

The acquisition module 402 may be configured to obtain information and/or data related to the multimedia content processing system 100. In some embodiments, the acquisition module 402 may obtain a multi-video stream including a plurality of video streams. Each of the plurality of video streams may be encoded according to a certain compression scheme, and may include multiple key frames (e.g., I-frames). In some embodiments, the multiple key frames in each video stream may be characterized by a frame rate and a key frame interval. A frame rate of a video stream may refer to a count of frames (or pictures) displayed or transmitted per second. A key frame interval of a video stream may be a count of frames between two successive key frames in the video stream. In some embodiments, the key frame interval may be in the form of time, i.e., the time that lapses between two successive key frames. For instance, two successive key frames correspond to two time points, and the key frame interval may be the time between the two time points, that is the time difference between the two time points. In some embodiments, the acquisition module 402 may obtain the multi-video stream from one or more components of the multimedia content processing system 100, such as the capture device 110, the terminal 130, a storage device (e.g., the storage device 150), or the like, or any combination thereof. Alternatively, or additionally, the acquisition module 402 may obtain the multi-video stream from an external source (e.g., a cloud disk) via the network 120.

The determination module 404 may be configured to determine a delay time of an initial key frame for each of the plurality of video streams. Herein, "an initial key frame in a video stream" may refer to a first key frame in the video stream when the video stream is transmitted. Herein, "a delay time of an initial key frame" may refer to a desired delay time of the initial key frame with respect to a time when the transmission of the corresponding video stream starts. In some embodiments, the delay times of initial key frames in different video streams may be different such that the transmission times of key frame(s) in the plurality of video streams may be staggered. In some embodiments, the determination module 404 may determine the delay time of the initial key frame for each video stream based on a plurality of frame rates and a plurality of key frame intervals of the plurality of video streams. More descriptions regarding the determination of the delay time of the initial key frame in each video stream may be found elsewhere in the present disclosure (e.g., process 600 and/or process 700 and the descriptions thereof).

The processing module 406 may be configured to process the plurality of video streams to determine a desired sending time of the initial key frame in the corresponding video streams based on the delay time of the initial key frame in each video stream. The desired sending time of the initial key frame in a video stream may correspond to a time when the initial key frame of the video stream is sent to the client terminal in response to a user request. In some embodiments, to achieve the desired sending time of the initial key frame in a video stream, the processing module 406 may process the video stream according to one or more approaches, such as recoding the video stream, adding a key frame in the video stream, postponing the transmission of the video stream, etc.

The transmission module 408 may be configured to transmit the plurality of processed video streams to the client terminal. The transmission times of the key frames in the plurality processed video streams may be staggered. When the processed video streams are transmitted, the network load may be equalized and the network fluctuations may be reduced or avoided. The processed video streams may be displayed on the client terminal (substantially) simultaneously, to achieve, e.g., the monitoring of multiple scenes captured in the video streams.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may further include one or more additional modules. For example, the processing device 140 may further include a storage module (not shown in FIG. 4) configured to store data generated by one or more of the modules of the processing device 140. As another example, the processing device 140 may further include a receiving module (not shown in FIG. 4) configured to receive a user request from the client terminal. The user request may be used for requesting to pull a plurality of video streams.

Figure 8:
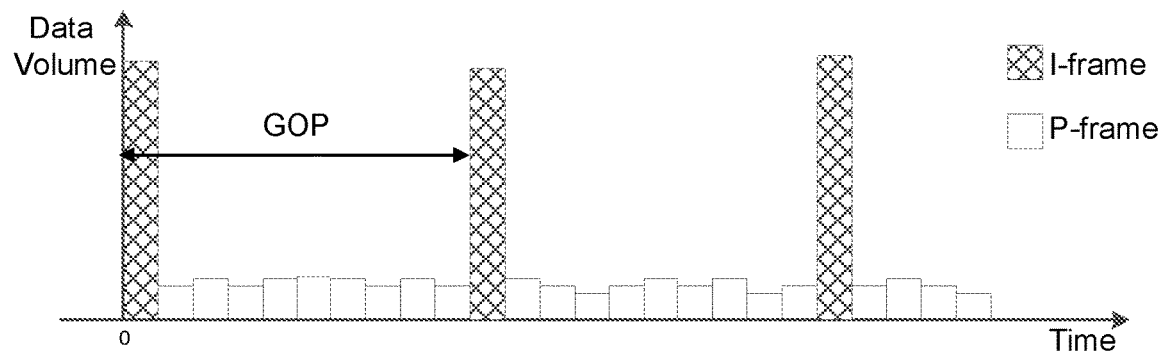
FIG. 8 shows an exemplary video stream according to some embodiments of the present disclosure.

In video surveillance fields, in order to reduce the bandwidth needed to transmit video data, video data may be encoded into streamed video including frames according to a compression scheme. Exemplary compression schemes may include moving picture experts group 2 or 4 (MPEG-2 or MPEG-4), H.261, H.263, H.264, H.265, etc. A video stream may include one or more key frames (e.g., interframe (I-frame)), one or more non-key frames (e.g., predictive frame (P-frame)), or the like. An I-frame may be encoded, e.g., by reducing the spatial redundancy in the picture, without referencing any other video frame. A P-frame may be encoded by referring to other video frames (e.g., the preceding frames) to achieve a higher compression ratio. FIG. 8 shows an exemplary video stream including I-frames and P-frames according to some embodiments of the present disclosure. As shown in FIG. 8, the data amount of an I-frame is roughly 8 to 10 times the data amount of a P-frame. I-frames occurs periodically in the video stream. In some embodiments, frames between two successive I-frames may be referred to as a group of pictures (GOP). That is, a GOP may begin with an I-frame and end immediately prior to the next I-frame in the video stream (e.g., the GOP as shown in FIG. 8). A GOP may include multiple frames including one I-frame and one or more P-frames. In some embodiments, a count of frames in a GOP (also referred to as the length of the GOP) may vary according to, e.g., a modulation scheme used to transmit a video stream. For example, a GOP for NTSC modulation may include 15 frames, while a GOP for PAL modulation may include 12 frames. It should be noted that a GOP may have other numbers of frames, such as 8, 10, 13, 20, 25, 30, 50, 75, or the like.

In some embodiments, a network video recorder (NVR) or a digital video recorder (DVR) may be used to observe or monitor a plurality of scenes captured by a plurality of cameras. That is, the NVR or DVR may request to pull a plurality of video streams corresponding to the plurality of scenes. A video stream may correspond to a video channel. In some embodiments, the plurality of video channels may be multiplexed on a single cable medium or a wireless network with a high bandwidth. As described above, the data amount of an I-frame may be greater than the data amount of a P-frame (e.g., being 8 to 10 times of the data amount of a P-frame). Thus, I-frame(s) may have a relatively large impact on the network transmission. If I-frames in different video streams are transmitted at the same time or at times close to each other, a network load peak rate may become excessively high, thus causing large network fluctuations or even exceeding a network load tolerance. Thus, it is desired to stagger the transmission times of the I-frames in different video streams to equalize the network load.

Figure 5:
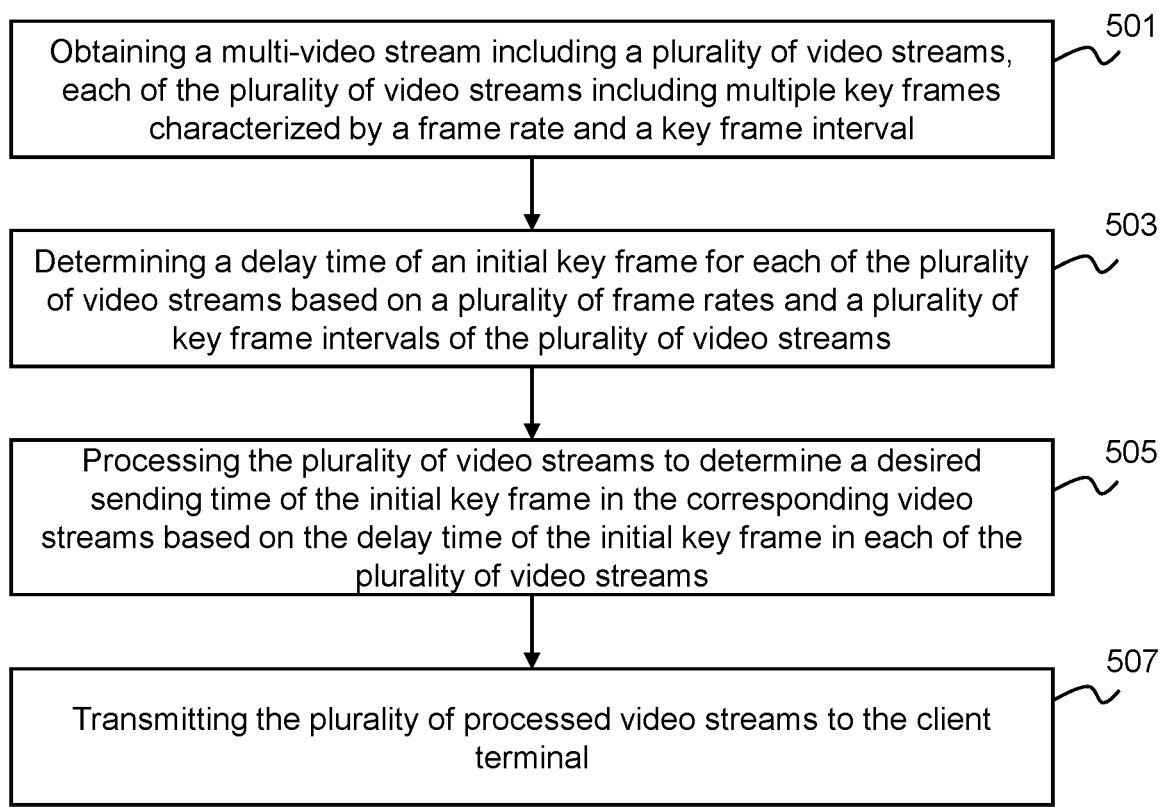
FIG. 5 is a flowchart illustrating an exemplary process for determining a desired sending time of an initial key frame in each of a plurality of video streams according to some embodiments of the present disclosure.

FIG. 5 is a flowchart illustrating an exemplary process for determining a desired sending time of an initial key frame in each of a plurality of video streams according to some embodiments of the present disclosure. For illustration purpose only, the processing device 140 may be described as a subject to perform the process 500. However, one of ordinary skill in the art would understand that the process 500 may also be performed by other entities. For example, one of ordinary skill in the art would understand that at least a portion of the process 500 may also be implemented on the computing device 200 as illustrated in FIG. 2 or the mobile device 300 as illustrated in FIG. 3. In some embodiments, one or more operations of process 500 may be implemented in the multimedia content processing system 100 as illustrated in FIG. 1. In some embodiments, one or more operations in the process 500 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals.

In some embodiments, the processing device 140 may receive a user request from a client terminal (e.g., the terminal 130). In some embodiments, the client terminal may be an NVR or a DVR. The user request may be to pull a plurality of video streams, for example, pull five video streams. In response to the user request, the processing device 140 may perform one or more following operations to stagger the transmission times of key frames (i.e., I-frames) in the plurality of video streams such that the network load may be equalized and/or balanced.

In 501, the processing device 140 (e.g., the acquisition module 402) may obtain a multi-video stream including a plurality of video streams. The plurality of video streams may correspond to the video streams requested by the client terminal (e.g., the terminal 130). Each of the plurality of video streams may be encoded according to a certain compression scheme, such as moving picture experts group 2 or 4 (MPEG-2 or MPEG-4), H.261, H.263, H.264, H.265, etc. A video stream may include multiple key frames (e.g., I-frames). The multiple key frames in a video stream may occur periodically. In some embodiments, the multiple key frames in the video stream may be characterized by a frame rate and a key frame interval. A frame rate of a video stream may refer to a count of frames (or pictures) displayed or transmitted per second. The frame rates in different video streams may be different. For example, the frame rate in a first video stream may be 25, while the frame rate in a second video stream may be 30. A key frame interval of a video stream may be a count of frames between two successive key frames in the video stream, which may also be referred to as the length of a GOP. In different video streams, the key frame intervals may be different. For example, in a first video stream, the key frame interval may be 25, while in a second video stream, the key frame interval may be 75. In some embodiments, the key frame interval may be set to a suitable value. If the key frame interval is relatively small, it may cause waste of network source. In some embodiments, a key frame (e.g., I-frame) may be used as a reference frame of a GOP. If the key frame interval is relatively large, once the key frame is broken, all frames in the GOP cannot be decoded, which may cause video jitter.

In some embodiments, the processing device 140 may obtain the multi-video stream from one or more components of the multimedia content processing system 100, such as the capture device 110, the terminal 130, a storage device (e.g., the storage device 150), etc. Alternatively, or additionally, the processing device 140 may obtain the multi-video stream from an external source (e.g., a cloud disk) via the network 120.

In 503, the processing device 140 (e.g., the determination module 404) may determine a delay time of an initial key frame for each of the plurality of video streams based on a plurality of frame rates and a plurality of key frame intervals of the plurality of video streams. It should be noted that, since the key frames in each of the plurality of video streams may occur periodically, the key frames in the plurality of video streams may also have a periodicity, and the period may also be referred to as a transmission period. Thus, it may only need to ensure that the key frames in the plurality of video streams are substantially evenly distributed in the transmission period. To equalize the distribution of the key frames in the plurality of video streams in the transmission period, the processing device 140 may determine a delay time of an initial key frame for each of the plurality of video streams. Herein, "an initial key frame in a video stream" may refer to a first key frame in the video stream when the video stream is transmitted. In some embodiments, the initial key frame may correspond to the first frame in the video stream. Alternatively, the initial key frame may correspond to a frame other than the first frame in the video stream. For example, a video stream may include one or more non-key frames (e.g., P-frames) in the video stream before the initial key frame. Herein, "a delay time of an initial key frame" may refer to a desired delay time of the initial key frame with respect to a time when the transmission of the corresponding video stream starts. In some embodiments, the delay times of initial key frames in different video streams may be different such that the transmission times of key frame(s) in the plurality of video streams may be staggered.

In some embodiments, to determine the delay time of the initial key frame for each of the plurality of video streams, the processing device 140 may normalize the plurality of key frame intervals to generate a plurality of normalized key frame intervals based on the plurality of frame rates and the plurality of key frame intervals. The processing device 140 may determine the delay time of the initial key frame for each video stream based on the plurality of normalized key frame intervals. More descriptions regarding the determination of the delay time of the initial key frame in each video stream may be found elsewhere in the present disclosure (e.g., process 600 and/or process 700, and the descriptions thereof).

In 505, the processing device 140 (e.g., the processing module 406) may process the plurality of video streams to determine a desired sending time of the initial key frame in the corresponding video streams based on the delay time of the initial key frame in each of the plurality of video streams. The desired sending time of the initial key frame in a video stream may correspond to a time when the initial key frame of the video stream is sent to the client terminal (e.g., the terminal 130) in response to the user request. In some embodiments, a desired sending time of an initial key frame in a video stream may depend on the delay time of the initial key frame and a time for transmitting the video stream. For example, if the delay time of an initial key frame in a video stream is 1 s, the desired sending time of the initial key frame may correspond to 1 s after the video stream is transmitted. Specifically, when the video stream is transmitted at 9:00:00, the desired sending time of the initial key frame may be 9:00:01. If the delay time of an initial key frame in a video stream is 0 s, the desired sending time of the initial key frame may coincide with the start of the transmission of the video stream.

In some embodiments, to determine a desired sending time of the initial key frame in a video stream, the processing device 140 may process the video stream according to one or more approaches, such as recoding the video stream, adding or inserting a key frame in the video stream, postponing the transmission of the video stream, etc., or a combination thereof. For example, if the delay time of the initial key frame is 0.5 s and the frame rate is 30, the processing device 140 may encode the video stream such that the fifteenth frame is the initial key frame. As another example, if the delay time of the initial key frame is 1 s and the frame rate is 25, the processing device 140 may add a key frame at the 25th frame. The added key frame may be encoded by reducing the spatial redundancy in the 25th picture of the video stream, without referencing any other video stream. As a further example, if the delay time of the initial key frame is 0.3 s and the first frame in the video stream is the initial key frame, the processing device 140 may postpone the transmission of the video stream by 0.3 s. In some embodiments, for the plurality of video streams, only one approach may be applied to determine the desired sending time of the initial key frame in each video stream. Alternatively, or additionally, for the plurality of video streams, two or more approaches may be applied to determine the desired sending time of the initial key frame in each video stream. For example, the desired sending time of the initial key frame in a first video stream may be determined by recoding the first video stream, while the desired sending time of the initial key frame in a second video stream may be determined by postponing the transmission of the second video stream. It should be noted that the above examples are merely provided for illustration purposes, and are not intended to limit the scope of the present disclosure.

In 507, the processing device 140 (e.g., the transmission module 408) may transmit the plurality of processed video streams to the client terminal. The transmission times of the key frames in the plurality processed video streams may be staggered. When the processed video streams are transmitted, the network load may be equalized and the network fluctuations may be reduced or avoided. The processed video streams may be displayed on the client terminal (substantially) simultaneously, to achieve, e.g., the monitoring of multiple scenes captured in the video streams.

In some embodiments of the present disclosure, a substantially uniform distribution of the key frames in the plurality of video streams may be implemented by determining the delay time of the initial key frame in each video stream, which may equalize the network load and reduce the network fluctuations.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, when the number of video streams requested by the client terminal is changed (e.g., adding a video stream corresponding to a new scene, closing a video stream corresponding to an existing scene), the processing device 140 may repeat to perform the process 500.

Figure 6:
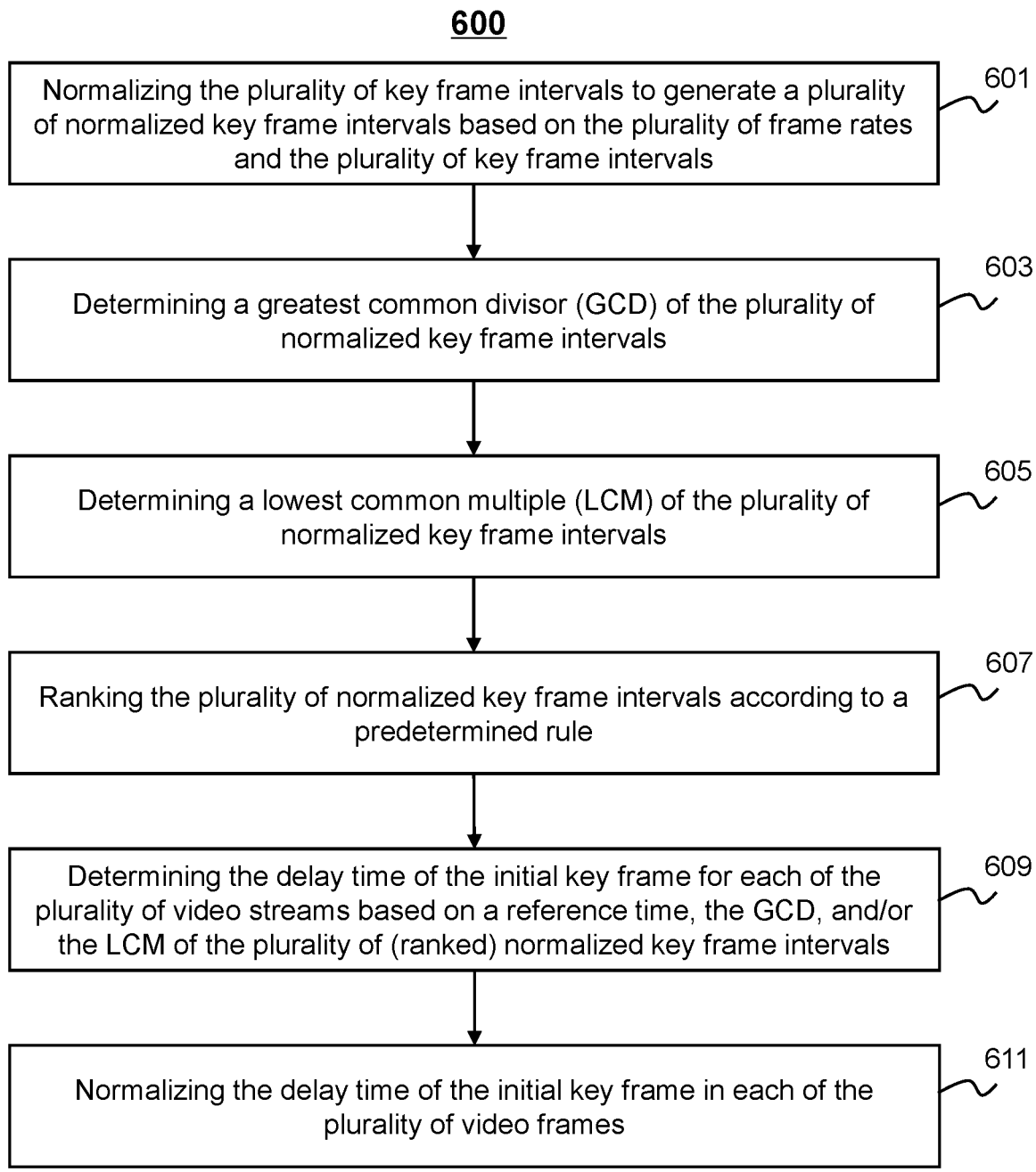
FIG. 6 is a flowchart illustrating an exemplary process for determining a delay time of an initial key frame for each of a plurality of video streams according to some embodiments of the present disclosure.

FIG. 6 is a flowchart illustrating an exemplary process for determining a delay time of an initial key frame for each of a plurality of video streams according to some embodiments of the present disclosure. For illustration purpose only, the processing device 140 may be described as a subject to perform the process 600. However, one of ordinary skill in the art would understand that the process 600 may also be performed by other entities. For example, one of ordinary skill in the art would understand that at least a portion of the process 600 may also be implemented on the computing device 200 as illustrated in FIG. 2 or the mobile device 300 as illustrated in FIG. 3. In some embodiments, one or more operations of process 600 may be implemented in the multimedia content processing system 100 as illustrated in FIG. 1. In some embodiments, one or more operations in the process 600 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals. In some embodiments, operation 503 may be performed according to the process 600.

As described in operation 503 of the process 500, the key frames in the plurality of video streams may also have a periodicity, and the period may also be referred to as a transmission period. To equalize the distribution of the key frames in the plurality of video streams, it may only need to equalize the distribution of the key frames in the plurality of video streams corresponding to one transmission period. In some embodiments, the processing device 140 may equalize the distribution of the key frames in the plurality of video streams corresponding to one transmission period by performing one or more of the following operations.

In 601, the processing device 140 (e.g., the determination module 404) may normalize the plurality of key frame intervals to generate a plurality of normalized key frame intervals based on the plurality of frame rates and the plurality of key frame intervals.

In some embodiments, to normalize the key frame interval(s), the processing device 140 may determine a plurality of key frame interval times corresponding to the plurality of key frame intervals based on the plurality of corresponding frame rates. In some embodiments, a key frame interval time may be a time between the transmission of two successive key frames. Merely by way of example, the processing device 140 may determine the plurality of key frame interval times corresponding to the plurality of video streams according to Equation (1) as below:

$$T_{i, 1 \leq i \leq k} = n_i/f_i, \quad (1)$$

where k refers to a count of the video streams (k being an integer); i refers the ith video stream (i being an integer); $n_i$ refers to a key frame interval of the ith video stream; $f_i$ refers to a frame rate of the ith video stream; and $T_i$ refers to the key frame interval time of the ith video stream.

In some embodiments, the processing device 140 may determine a reference time based on the plurality of frame rates. The reference time may be considered as a criterion for normalizing the key frame interval(s). Merely by way of example, the processing device 140 may determine the reference time according to Equation (2) as below:

$$t = 1/\text{LCM}(f_1, f_2, \ldots, f_k), \quad (2)$$

where t refers the reference time, $\text{LCM}(f_1, f_2, \ldots, f_k)$ refers a lowest common multiple (LCM) of the plurality of frame rates corresponding to the plurality of video streams.

In some embodiments, the processing device 140 may determine the plurality of normalized key frame intervals based on the plurality of key frame interval times and the reference time. Merely by way of example, the processing device 140 may determine the plurality of normalized key frame intervals according to Equation (3) as below:

$$N_{i, 1 \leq i \leq k} = T_i/t, \quad (3)$$

where $N_i$ refers to the ith normalized key frame interval.

For illustration purposes, assuming that there may be five video streams. For a first video stream, the frame rate $f_1$ may be 25, and the key frame interval $n_1$ may be 25. For a second video steam, the frame rate $f_2$ may be 25, and the key frame interval $n_2$ may be 50. For a third video stream, the frame rate $f_3$ may be 30, and the key frame interval $n_3$ may be 30. For a fourth video stream, the frame rate $f_4$ may be 50, the key frame interval $n_4$ may be 75. For a fifth video stream, the frame rate $f_5$ may be 50, and the key frame interval $n_5$ may be 60. The processing device 140 may determine a key frame interval time for each of the five video streams according to Equation (1). Specifically, the key frame interval time of the first video stream may be $$T_1 = \frac{n_1}{f_1} = \frac{25}{25} = 1 \text{ s},$$

the key frame interval time of the second video stream may be $$T_2 = \frac{n_2}{f_2} = \frac{50}{25} = 2 \text{ s},$$

the key frame interval time of the third video stream may be $$T_3 = \frac{n_3}{f_3} = \frac{30}{30} = 1 \text{ s},$$

the key frame interval time of the fourth video steam may be, $$T_5 = \frac{n_4}{f_4} = \frac{75}{50} = 1.5 \text{ s},$$

and the key frame interval time of the fifth video stream may be $$T_1 = \frac{n_5}{f_5} = \frac{60}{50} = 1.2 \text{ s}.$$

The processing device 140 may determine a reference time of the five video streams according to Equation (2). Specifically, the reference time may be $$t = \frac{1}{LCM(f_1, f_2, f_3, f_4, f_4)} = \frac{1}{LCM(25, 25, 30, 50, 50)} = \frac{1}{150} \text{ s}.$$

The processing device 140 may then determine a normalized key frame interval for each of the five video streams according to Equation (3). Specifically, the normalized key frame interval of the first video stream may be $$N_1 = \frac{T_1}{t} = 1 * 150 = 150,$$

the normalized key frame interval of the second video stream may be $$N_2 = \frac{T_2}{t} = 2 * 150 = 300,$$

the normalized key frame interval of the third video stream may be $$N_3 = \frac{T_3}{t} = 1 * 150 = 150,$$

the normalized key frame interval of the fourth video stream may be $$N_4 = \frac{T_4}{t} = 1.5 * 150 = 225,$$

and the normalized key frame interval of the fifth video stream may be $$N_5 = \frac{T_5}{t} = 1.2 * 150 = 180.$$

It should be noted that the above normalization approach of the key frame intervals is merely provided for illustration purposes, and is not intended to limit the scope of the present disclosure. In some embodiments, the processing device 140 may normalize the plurality of key frame intervals according to another approach. The normalization of the key frame intervals may implement the discretization of the corresponding key frame interval times, which may facilitate the subsequent calculations. It shall be understood that operation 601 may be omitted, and the plurality of key frame intervals may not need to be normalized, and the corresponding key frame interval times may be directly used for the subsequent calculations. Alternatively, or additionally, the processing device 140 may normalize the plurality of frame rates other than the plurality of key frame intervals to implement the discretization of the corresponding key frame interval times.

In 603, the processing device 140 (e.g., the determination module 404) may determine a greatest common divisor (GCD) of the plurality of normalized key frame intervals. The GCD may refer to the maximum interval in which the key frames in the plurality of video streams not repeat. Merely by way of example, the processing device 140 may determine the GCD according to Equation (4) as below:

$$\text{GCD} = \text{GCD}(N_1, N_2, \ldots, N_K). \quad (4)$$

In some embodiments, for the above five video streams, the GCD may be determined according to Equation (4), that is, $\text{GCD} = \text{GCD}(N_1, N_2, N_3, N_4, N_5) = 15$.

In 605, the processing device 140 (e.g., the determination module 404) may determine a lowest common multiple (LCM) of the plurality of normalized key frame intervals. In some embodiments, the LCM may reflect a periodic transmission period of the plurality of video streams. Merely by way of example, the processing device 140 may determine the LCM according to Equation (5) as below:

$$\text{LCM} = \text{LCM}(N_1, N_2, \ldots, N_K). \quad (5)$$

In some embodiments, for the above five video streams, the LCM may be determined according to Equation (5), that is, $\text{LCM} = \text{LCM}(N_1, N_2, N_3, N_4, N_5) = 900$.

In 607, the processing device 140 (e.g., the determination module 404) may rank the plurality of normalized key frame intervals according to a predetermined rule. In some embodiments, the processing device 140 may rank the normalized key frame intervals such that the distribution of the key frames in the plurality of video streams is optimized and/or equalized. That is, the key frames in the plurality of video streams may be substantially evenly distributed in a transmission period, instead of concentrated in a certain portion of the transmission period. The predetermined rule may be a default setting of the multimedia content processing system 100. In some embodiments, the predetermined rule may be preset or adjusted by a user via the client terminal (e.g., the terminal 130).

In some embodiments, the predetermined rule may be that the normalized key frame intervals corresponding to odd sequence numbers of the plurality of video streams may be ranked from small to large, and the normalized key frame intervals correspond to even sequence numbers of the plurality of video streams may be ranked from large to small. Alternatively, the predetermined rule may be that the normalized key frame intervals corresponding to odd sequence numbers of the plurality of video streams may be ranked from large to small, and the normalized key frame intervals correspond to even sequence numbers of the plurality of video streams may be ranked from small to large. In some embodiments, for the above five video streams, if the normalized key frame intervals corresponding to odd sequence numbers of the five video streams are ranked from large to small, and the normalized key frame intervals correspond to even sequence numbers of the five video streams are ranked from small to large, the ranked normalized key frame intervals may be $N_5^1=180$, $N_4^2=225$, $N_1^3=150$, $N_2^4=300$, and $N_3^5=150$. It should be noted that the above descriptions of the predetermined rule are merely provided for illustration purposes, and is not intended to limit the scope of the present disclosure.

In 609, the processing device 140 (e.g., the determination module 404) may determine the delay time of the initial key frame for each of the plurality of video streams based on the reference time, the GCD, and/or the LCM of the plurality of ranked normalized key frame intervals. In some embodiments, the processing device 140 may determine the delay time of the initial key frame for each video stream according to Equation (6) as below:

$$D^{j,1<<j<<k}=t*(LCM+GCD)*(j-1)/k, \quad (6)$$

where j refers to the sequence number of the ranked normalized key frame intervals (j being an integer); $D^j$ refers to the delay time of the initial key frame corresponding to the jth ranked normalized key frame interval.

In some embodiments, for the above five video streams, the delay time of the initial key frame corresponding to the first ranked normalized key frame interval may be $$D_5^1 = t*(LCM+GCD)*\frac{j-1}{k} = \frac{1}{150}*(15+900)*0 = 0 \text{ s},$$

the delay time of the initial key frame corresponding to the second ranked normalized key frame interval may be $$D_4^2 = t*(LCM+GCD)*\frac{j-1}{k} = \frac{1}{150}*(15+900)*1/5 = 1.22 \text{ s},$$

the delay time of the initial key frame corresponding to the third ranked normalized key frame interval may be $$D_1^3 = t*(LCM+GCD)*\frac{j-1}{k} = \frac{1}{150}*(15+900)*2/5 = 2.44 \text{ s},$$

the delay time of the initial key frame corresponding to the fourth ranked normalized key frame interval may be $$D_2^4 = t*(LCM+GCD)*\frac{j-1}{k} = \frac{1}{150}*(15+900)*3/5 = 3.66 \text{ s},$$

and the delay time of the initial key frame corresponding to the fifth ranked normalized key frame interval may be $$D_3^5 = t*(LCM+GCD)*\frac{j-1}{k} = \frac{1}{150}*(15+900)*4/5 = 4.88 \text{ s}.$$

In 611, the processing device 140 (e.g., the determination module 404) may normalize the delay time of the initial key frame in each of the plurality of video streams. In some embodiments, the key frames in a video stream may have a periodicity. When the delay time of the initial key frame in the video stream is greater than the key frame interval time of the video stream, one or more key frames may exist within the delay time without affecting the substantially uniform distribution of the key frames in the plurality of video streams. Merely by way of example, if the delay time of an initial key frame in a video stream is 21 s, and the key frame interval time of the video stream is 10 s. Two key frames may exist within the delay time, that is, a key frame with a delay time of 1 s, a key frame with a delay time of 11 s. In some embodiments, the processing device 140 may normalize the delay time of the initial key frame in each video stream according to Equation (7) as below:

$$D^{j,0<<j<<x}=D^{j,0<<j<<k} \bmod T^j, \quad (7)$$

where "mod" refers to the operator of remainder; $T^j$ refers to the key frame interval time corresponding to the jth ranked normalized key frame interval; and $D^{ij}$ refers to the normalized delay time of the initial key frame corresponding to the jth ranked normalized key frame interval.

In some embodiments, for the above five video streams, the normalized delay time of the initial key frame corresponding to the first ranked normalized frame interval may be $D_5'^1=D_5^1 \bmod T_5^1=0$ s, the normalized delay time of the initial key frame corresponding to the second ranked normalized frame interval may be $D_4'^2=D_4^2 \bmod T_4^2=1.22$ s, the normalized delay time of the initial key frame corresponding to the third ranked normalized frame interval may be $D_1'^3=D_1^3 \bmod T_1^3=0.44$ s, the normalized delay time of the initial key frame corresponding to the fourth ranked normalized frame interval may be $D_2'^4=D_2'^4 \bmod T_2^4=1.66$ s, and the normalized delay time of the initial key frame corresponding to the fifth ranked normalized frame interval may be $D_3'^5=D_3^5 \bmod T_3^5=0.88$ s.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, operation 607 may be omitted, and the normalized key frame intervals may not need to be ranked. The processing device 140 may determine the delay time of the initial key frame for each video stream based on the reference time, the GCD and/or the LCM of the plurality of normalized key frame intervals. In some embodiments, operation 611 may be omitted, and the delay time of the initial key frame in each video stream may not need to be further normalized.

In some embodiments, operation 605 may be omitted. The processing device 140 may determine the delay time of the initial key frame for each video stream based on the reference time and the GCD of the plurality of ranked normalized key frame intervals. Merely by way of example, the processing device 140 may determine the delay time of the initial key frame for each video stream according to Equation (6') as below:

$$D^{j,0<<j<<k} = t*GCD*(j-1)/k, \quad (6')$$

In some embodiments, for the above five video streams, the delay time of the initial key frame corresponding to the first ranked normalized key frame interval may be $$D_5^1 = t*GCD*\frac{j-1}{k} = \frac{1}{150}*15*0 = 0 \text{ s},$$

the delay time of the initial key frame corresponding to the second ranked normalized key frame interval may be $$D_4^2 = t*GCD*\frac{j-1}{k} = \frac{1}{150}*15*1/5 = 0.02 \text{ s},$$

the delay time of the initial key frame corresponding to the third ranked normalized key frame interval may be $$D_1^3 = t*GCD*\frac{j-1}{k} = \frac{1}{150}*15*2/5 = 0.04 \text{ s},$$

the delay time of the initial key frame corresponding to the fourth ranked normalized key frame interval may be $$D_2^4 = t*GCD*\frac{j-1}{k} = \frac{1}{150}*15*3/5 = 0.06 \text{ s},$$

and the delay time of the initial key frame corresponding to the fifth ranked normalized key frame interval may be $$D_3^5 = t*GCD*\frac{j-1}{k} = \frac{1}{150}*15*4/5 = 0.08 \text{ s}.$$

Figure 7:
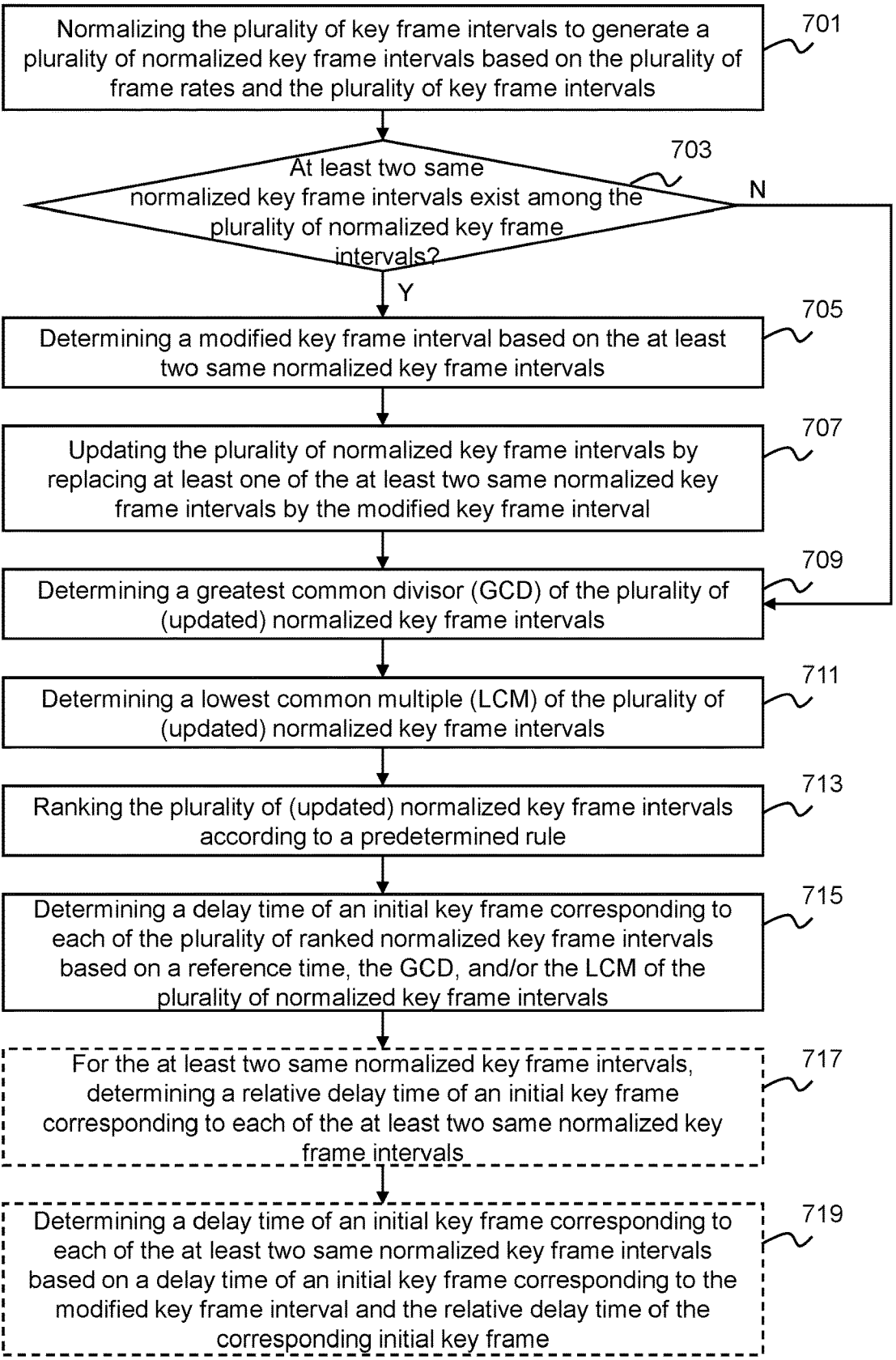
FIG. 7 is a flowchart illustrating an exemplary process for determining a delay time of an initial key frame for each of a plurality of video streams according to some embodiments of the present disclosure.

FIG. 7 is a flowchart illustrating an exemplary process for determining a delay time of an initial key frame for each of a plurality of video streams according to some embodiments of the present disclosure. For illustration purpose only, the processing device 140 may be described as a subject to perform the process 700. However, one of ordinary skill in the art would understand that the process 700 may also be performed by other entities. For example, one of ordinary skill in the art would understand that at least a portion of the process 700 may also be implemented on the computing device 200 as illustrated in FIG. 2 or the mobile device 300 as illustrated in FIG. 3. In some embodiments, one or more operations of the process 700 may be implemented in the multimedia content processing system 100 as illustrated in FIG. 1. In some embodiments, one or more operations in the process 700 may be stored in the storage device 150 and/or the storage (e.g., the ROM 230, the RAM 240, etc.) in the form of instructions, and invoked and/or executed by the processing device 140 (e.g., the processor 220 of the processing device 140, or one or more modules of the processing device 140). In some embodiments, the instructions may be transmitted in the form of electronic current or electrical signals. In some embodiments, operation 503 may be performed according to the process 700.

In 701, the processing device 140 (e.g., the determination module 404) may normalize the plurality of key frame intervals to generate a plurality of normalized key frame intervals based on the plurality of frame rates and the plurality of key frame intervals. In some embodiments, operation 701 may be performed in a similar manner with operation 601, and the relevant descriptions are not repeated here.

In 703, the processing device 140 (e.g., the determination module 404) may determine whether at least two same normalized key frame intervals exist among the plurality of normalized key frame intervals. In response to a determination that at least two same normalized key frame intervals exist, the processing device 140 may proceed to operation 705. In 705, the processing device 140 (e.g., the determination module 404) may determine a modified key frame interval based on the at least two same normalized key frame intervals. In some embodiments, the processing device 140 may determine the modified key frame interval according to Equation (8) as below:

$$N'=N/M, \quad (8)$$

where N refers to the normalized key frame interval of the same normalized key frame intervals; M refers to the count of the same normalized key frame intervals (M being an integer); and N' refers to the modified key frame interval. In some embodiments, for the five video streams as illustrated in FIG. 6, the normalized key frame interval of the first video stream $N_1$ and the normalized key frame interval of the third video stream $N_3$ are the same. The processing device 140 may determine a modified key frame interval according to Equation (8), that is, $$N_{1,3}' = \frac{N_1}{M} = \frac{150}{2} = 75.$$

In 707, the processing device 140 (e.g., the determination module 404) may update the plurality of normalized key frame intervals by replacing at least one of the at least two same normalized key frame intervals by the modified key frame interval. Merely by way of example, for the above five video streams, the updated normalized key frame intervals may be $N_{1,3}'=75$, $N_2=300$, $N_4=225$, and $N_5=180$.

In 709, the processing device 140 (e.g., the determination module 404) may determine a GCD of the plurality of updated normalized key frame intervals. In some embodiments, the processing device 140 may determine the GCD according to Equation (4) as illustrated in FIG. 6. In some embodiments, for the five video streams, the GCD may be determined as GCD'=GCD($N_{1,3}'$, $N_2$, $N_4$, $N_5$)=15.

In 711, the processing device 140 (e.g., the determination module 404) may determine an LCM of the plurality of updated normalized key frame intervals. In some embodiments, the processing device 140 may determine the LCM according to Equation (5) as illustrated in FIG. 6. In some embodiments, for the five video streams, the LCM may be determined as LCM'=LCM($N_{1,3}'$, $N_2$, $N_4$, $N_5$)=900.

In 713, the processing device 140 (e.g., the determination module 404) may rank the plurality of updated normalized key frame intervals according to a predetermined rule. In some embodiments, the predetermined rule has been described in connection with FIG. 6, and the descriptions are not repeated here. In some embodiments, for the five video streams, if the updated normalized key frame intervals corresponding to odd sequence numbers of the plurality of updated normalized key frame intervals are ranked from small to large, and the updated normalized key frame intervals corresponding to even sequence numbers of the plurality of updated normalized key frame intervals are ranked from large to small, the ranked normalized key frame intervals may be $N_{1,3}{'}_1=75$, $N_2{}^2=300$, $N_4{}^3=225$, and $N_5{}^4=180$.

In 715, the processing device 140 (e.g., the determination module 404) may determine a delay time of an initial key frame corresponding to each of the plurality of ranked normalized key frame intervals based on the reference time, the GCD, and/or the LCM of the plurality of normalized key frame intervals. In some embodiments, the processing device 140 may determine the delay time of the initial key frame corresponding to each ranked normalized key frame interval according to Equation (6) as illustrated in FIG. 6. In some embodiments, the delay time of the initial key frame corresponding to the first ranked normalized key frame interval may be $$D_{1,3}^1 = t*(LCM' + GCD')*\frac{j-1}{k} = \frac{1}{150}*(15+900)*0 = 0 \text{ s,}$$

the delay time of the initial key frame corresponding to the second ranked normalized key frame interval may be $$D_2^2 = t*(LCM' + GCD')*\frac{j-1}{k} = \frac{1}{150}*(15+900)*1/4 = 1.525 \text{ s,}$$

the delay time of the initial key frame corresponding to the third ranked normalized key frame interval may be $$D_4^3 = t*(LCM' + GCD')*\frac{j-1}{k} = \frac{1}{150}*(15+900)*2/4 = 3.05 \text{ s,}$$

and the delay time of the initial key frame corresponding to the fourth ranked normalized key frame interval may be $$D_5^4 = t*(LCM' + GCD')*\frac{j-1}{k} = \frac{1}{150}*(15+900)*3/4 = 4.575 \text{ s.}$$

In some embodiments, the delay time of the initial key frame corresponding to the modified key frame interval may correspond to the at least two same normalized key frame intervals. For example, the delay time of the initial key frame corresponding to the first ranked normalized key frame interval $D_{1,3}$ may correspond to two same normalized key frame intervals corresponding to the first video stream and the third video stream. Thus, it may need to perform one or more operations to distinguish the delay times of the initial key frames corresponding to the at least two same normalized key frame intervals.

In 717, the processing device 140 (e.g., the determination module 404) may, for the at least two same normalized key frame intervals, determine a relative delay time of an initial key frame corresponding to each of the at least two same normalized key frame interval. Merely by way of example, the processing device 140 may determine the relative delay time of the initial key frame corresponding to each of the at least two same normalized key frame interval according to Equation (9) as below:

$$Dr^{l,1\leq l \leq M} = T*(l-1)/M, \tag{9}$$

where T refers to the key frame interval time of the same normalized key frame intervals; M refers to the count of the same normalized key frame intervals (M being an integer); l refers to the lth normalized key frame interval in the same normalized key frame intervals (l being an integer); and $Dr^l$ refers to the relative delay time of the initial key frame corresponding to the lth normalized key frame interval in the same normalized key frame intervals. In some embodiments, for the first video stream and the third video stream, the relative delay time of the initial key frame in the first video stream may be $$Dr_1^1 = T_1 * \frac{l-1}{M} = 0 \text{ s,}$$

and the relative delay time of the initial key frame in the third video stream may be $$Dr_3^2 = T_3 * \frac{l-1}{M} = 1 \text{ s} * \frac{1}{2} = 0.5 \text{ s.}$$

In 719, the processing device 140 (e.g., the determination module 404) may determine a delay time of an initial key frame corresponding to each of the at least two same normalized key frame intervals based on a delay time of an initial key frame corresponding to the modified key frame interval and the relative delay time of the corresponding initial key frame. In some embodiments, the processing device 140 may determine the delay time of the initial key frame corresponding to each of the at least two same normalized key frame intervals according to Equation (10) as below:

$$D^l = D + Dr^l, \tag{10}$$

where D refers the delay time of the initial key frame corresponding to the modified key frame interval, $Dr^l$ refers to the relative delay time of the initial key frame corresponding to the lth normalized key frame interval in the same normalized key frame intervals; and $D^l$ refers to the delay time of the initial key frame corresponding to the lth normalized key frame interval in the same normalized key frame intervals. In some embodiments, for the first video stream and the third video stream, the delay time of the initial key frame in the first video stream may be $D_1{}^{1,1}=D_{1,3}{}^1+Dr_1{}^1=0$ s, and the delay time of the initial key frame in the third video stream may be $D_3{}^{1,2}=D_{1,3}{}^1+Dr_3{}^2=0.5$ s. Thus, for the five video streams, the delay time of the initial key frame in the first video stream may be $D_1{}^{1,1}=0$ s, the delay time of the initial key frame in the second video stream may be $D_2{}^2=1.525$ s, the delay time of the initial key frame in the third video stream may be $D_3{}^{1,2}=0.5$ s, the delay time of the initial key frame in the fourth video stream may be $D_4{}^3=3.05$ s, and the delay time of the initial key frame in the fifth video stream may be $D_5{}^4=4.575$ s.

Referring back to operation 703, in response to a determination that there is no same normalized key frame interval among the plurality of normalized key frame intervals, the processing device 140 may proceed to 709. In 709, the processing device 140 may determine a GCD of the plurality of normalized key frame intervals. In 711, the processing device 140 may determine an LCM of the plurality of normalized key frame intervals. In 713, the processing device 140 may rank the plurality of normalized key frame intervals according to the predetermined rule. In 715, the processing device 140 may determine a delay time of an initial key frame corresponding to each of the plurality of ranked normalized key frame intervals based on a reference time, the GCD, and/or the LCM of the plurality of normalized key frame intervals. In this case, operations 709 through 715 may be performed in a similar manner with operations 603 through 609, and the relevant descriptions are not repeated here.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140 may repeat operations 703 to 707 to perform one or more iterations until there is no same normalized key frame interval among the plurality of normalized key frame intervals. Then the processing device 140 may terminate the one or more iterations.

In some embodiments, after operation 719, the processing device 140 may further normalize the delay time of the initial key frame in each video stream according to, e.g., Equation (7) as illustrated in FIG. 6. In some embodiments, for the five video streams, the normalized delay time of the initial key frame in the first video stream may be $D_1^{'1}$, $_1 = D_1^{1,1}$ mod $T_1 = 0$ s, the normalized delay time of the initial key frame in the second video stream may be $D_2^{'2} = D_2^{2}$ mod $T_2 = 1.525$ s, the normalized delay time of the initial key frame in the third video stream may be $D_3^{'1,2} = D_3^{1,2}$ mod $T_3 = 0.5$ s, the normalized delay time of the initial key frame in the fourth video stream may be $D_4^{'3} = D_4^{3}$ mod $T_4 = 0.05$ s, and the normalized delay time of the initial key frame in the fifth video stream may be $D_5^{'4} = D_5^{4}$ mod $T_5 = 0.003$ s.

Figure 9A:
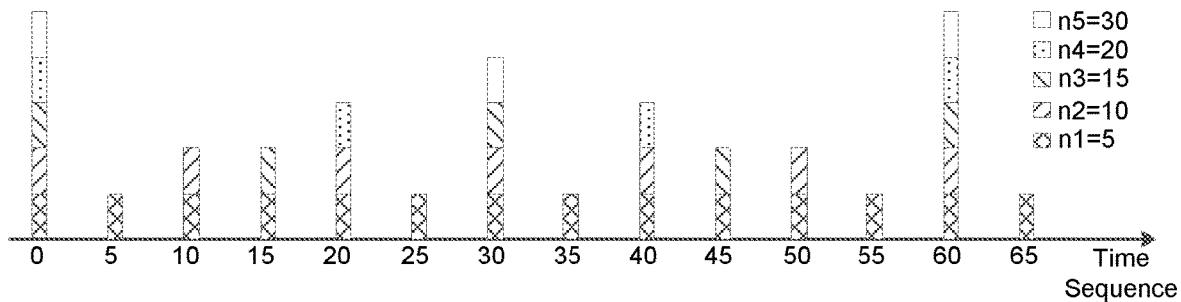
FIG. 9A shows five exemplary video streams according to some embodiments of the present disclosure.

FIG. 9A shows five exemplary video streams according to some embodiments of the present disclosure. For simplicity, non-key frames (e.g., P-frame) in the video streams are not shown. The key frame interval of the first video stream is 5, the key frame interval of the second video stream is 10, the key frame interval of the third video stream is 15, the key frame interval of the fourth video stream is 20, and the key frame interval of the fifth video stream is 30. The five video streams may correspond to the same frame rates. Table 1 shows exemplary sending times of key frames in the five video streams. In some embodiments, the sending times of key frames may be represented as time sequences. A time sequence may correspond to a time of sending one frame (either key frame or non-key frame) in the video streams. As shown in FIG. 9A and/or Table 1, the initial key frames in the five video streams are transmitted simultaneously (corresponding to the time sequence 0), which may result in excessive network load. When the network load exceeds the network load tolerance, data loss (or packet loss) may occur, thus reducing the video quality. Besides, the key frame intervals in different video streams may be different. In different time sequences, different numbers of key frames may be transmitted simultaneously, which may cause large network fluctuations. As shown in FIG. 9A and/or Table 1, at time sequence 10, the key frame in the first video stream and the key frame in the second video stream are transmitted simultaneously. At time sequence 20, the key frame in the first video stream, the key frame in the second video stream, and the key frame in the fourth video stream are transmitted simultaneously. At time sequence 30, the key frame in the first video stream, the key frame in the second video stream, the key frame in the third video stream, and the key frame in the fifth video stream are transmitted simultaneously.

Thus, it may need to stagger the transmission times of the key frames in different video stream to equalize the network load.

Figure 9B:
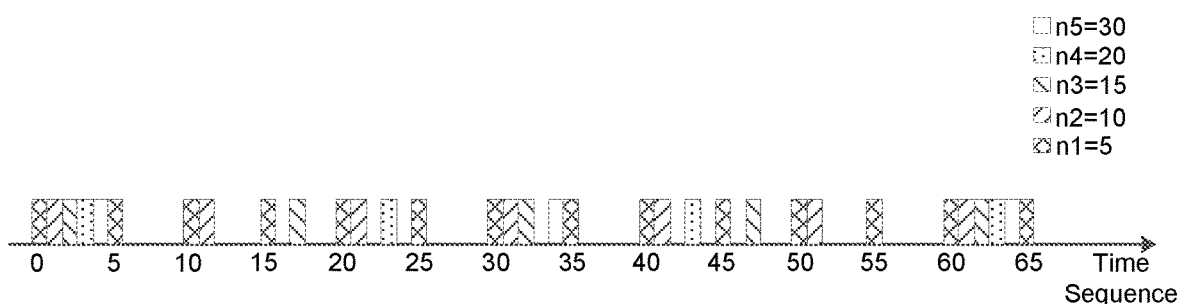
FIG. 9B shows five processed video streams according to some embodiments of the present disclosure.

FIG. 9B shows five processed video streams according to some embodiments of the present disclosure. Table 2 shows exemplary sending times of key frames in the five processed video streams. The five processed video streams may be determined by processing the five video streams in FIG. 9A according to the method disclosed in the present disclosure. In some embodiments, the five video streams may be processed according to a delay time of an initial key frame in each video stream. As shown in FIG. 9B and/or Table 2, the transmission times of the all key frames in the five processed video streams are staggered. Thus, the network load may be balanced.

TABLE 1

Exemplary sending times of key frames in five video streams

| Time Sequence | Key Frame Interval | | | | | Count of Key Frames |
|---|---|---|---|---|---|---|
| | 5 | 10 | 15 | 20 | 30 | |
| 0 | 1 | 1 | 1 | 1 | 1 | 5 |
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 1 | 0 | 0 | 0 | 0 | 1 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 1 | 1 | 0 | 0 | 0 | 2 |
| 11 | 0 | 0 | 0 | 0 | 0 | 0 |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | 1 | 0 | 1 | 0 | 0 | 2 |
| ... | ... | ... | ... | ... | ... | ... |
| 60 | 1 | 1 | 1 | 1 | 1 | 5 |

TABLE 2

Exemplary sending times of key frames in five processed video streams

| Time Sequence | Key Frame Interval | | | | | Count of Key Frames |
|---|---|---|---|---|---|---|
| | 5 | 10 | 15 | 20 | 30 | |
| 0 | 1 | 0 | 0 | 0 | 0 | 1 |
| 1 | 0 | 1 | 0 | 0 | 0 | 1 |
| 2 | 0 | 0 | 1 | 0 | 0 | 1 |
| 3 | 0 | 0 | 0 | 1 | 0 | 1 |
| 4 | 0 | 0 | 0 | 0 | 1 | 1 |
| 5 | 1 | 0 | 0 | 0 | 0 | 1 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 1 | 0 | 0 | 0 | 0 | 1 |
| 11 | 0 | 1 | 0 | 0 | 0 | 1 |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | 1 | 0 | 1 | 0 | 0 | 1 |
| ... | ... | ... | ... | ... | ... | ... |
| 60 | 1 | 0 | 0 | 0 | 0 | 1 |
| 61 | 0 | 1 | 0 | 0 | 0 | 1 |
| 62 | 0 | 0 | 1 | 0 | 0 | 1 |
| 63 | 0 | 0 | 0 | 1 | 0 | 1 |

TABLE 2-continued

Exemplary sending times of key frames in five processed video streams

| Time Sequence | Key Frame Interval | | | | | Count of Key Frames |
|---|---|---|---|---|---|---|
| | 5 | 10 | 15 | 20 | 30 | |
| 64 | 0 | 0 | 0 | 0 | 1 | 1 |

In some embodiments, the system and method disclosed herein may be used in the transmission of one or more streams of data (or referred to as data streams) with periodicity. As used herein, periodicity of a data stream refers to that the volume of data of the data stream that is transmitted varies periodically, that the transmission of high-volume sections (or referred to as high-volume frames) of the data stream is spaced with the transmission of low-volume sections (or referred to as low-volume frames) of the data stream, and that the distribution of the high-volume sections and the low-volume sections are periodic. For instance, a data stream may include images or video frames retrieved periodically from a data source (e.g., data acquired by an imaging device, a video camera, a web cameral, etc.). To apply the system and method described herein with reference to video streams including I-frames and P-frames, a high-volume section may correspond to an I-frame, and a low-volume section may correspond to a P-frame. In some embodiments, a low-volume section may be a zero-volume section with no data. A data stream may be a continuous stream (in which the low-volume sections include data) or a stream with discrete sections (in which the low-volume sections include zero-volume sections without data). As used herein, the phrases high-volume and low-volume are used in relative terms in that a high-volume section of a data stream includes a larger volume of data than a low-volume section of the data stream. The transmission of the one or more data streams with periodicity may be arranged according to embodiments disclosed herein, e.g., FIGS. 4-9B and the descriptions thereof. The transmission times of the high-volume sections in the one or more data streams may be staggered, thus realizing a balanced and/or equalized network load.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for a multi-video stream transmission to a client terminal, the system comprising:
   at least one storage device storing a set of instructions;
   at least one processor in communication with the at least one storage device, wherein when executing the set of instructions, the at least one processor is configured to cause the system to perform operations including:
   obtaining a multi-video stream including a plurality of video streams corresponding to a plurality of scenes captured by a plurality of cameras, each of the plurality of video streams including multiple key frames characterized by a frame rate and a key frame interval, a key frame interval of a video stream being a count of frames between two successive key frames in the video stream, wherein at least two frame rates of the plurality of video streams are different;
   determining, based on a plurality of frame rates and a plurality of key frame intervals of the plurality of video streams, a delay time of an initial key frame for each of the plurality of video streams by:
      i) normalizing, based on the plurality of frame rates and the plurality of key frame intervals, the plurality of key frame intervals to generate a plurality of normalized key frame intervals, and
      ii) determining, based on the plurality of normalized key frame intervals, the delay time of the initial key frame for each of the plurality of video streams;
   processing, based on the delay time of the initial key frame in each of the plurality of video streams, the plurality of video streams to determine a desired sending time of the initial key frame in the corresponding video streams, the desired sending time of the initial key frame in a video stream corresponding to a time when the initial key frame of the video stream is sent to the client terminal; and
   transmitting, to the client terminal, the plurality of processed video streams.

2. The system of claim 1, wherein to normalize the plurality of key frame intervals, the at least one processor is configured to cause the system to perform additional operations including: determining, based on the plurality of corresponding frame rates, a plurality of key frame interval times corresponding to the plurality of key frame intervals, a key frame interval time being a time between transmission of two successive key frames;
   determining a reference time based on the plurality of frame rates; and
   determining, based on the plurality of key frame interval times and the reference time, the plurality of normalized key frame intervals.

3. The system of claim 2, wherein to determine the delay time of the initial key frame for each of the plurality of video streams, the at least one processor is configured to cause the system to perform additional operations including: determining a greatest common divisor (GCD) of the plurality of normalized key frame intervals; and
   determining, based on the reference time and the GCD of the plurality of normalized key frame intervals, the delay time of the initial key frame for each of the plurality of video streams.

4. The system of claim 3, wherein to determine the delay time of the initial key frame for each of the plurality of video streams, the at least one processor is further configured to cause the system to perform additional operations including: determining a lowest common multiple (LCM) of the plurality of normalized key frame intervals; and
   determining, based on the reference time, the GCD, and the LCM of the plurality of normalized key frame intervals, the delay time of the initial key frame for each of the plurality of video streams.

5. The system of claim 1, wherein to determine the delay time of the initial key frame for each of the plurality of video streams, the at least one processor is further configured to cause the system to perform additional operations including: ranking the plurality of normalized key frame intervals according to a predetermined rule; and
   determining, based on the ranking, the delay time of the initial key frame for each of the plurality of video streams.

6. The system of claim 1, wherein the at least one processor is further configured to cause the system to perform additional operations including: performing one or more iterations, each of the one or more iterations including:
   determining whether at least two same normalized key frame intervals exist among the plurality of normalized key frame intervals;
   in response to a determination that at least two same normalized key frame intervals exist, determining a modified key frame interval based on the at least two same normalized key frame intervals; and
   updating the plurality of normalized key frame intervals by replacing at least one of the at least two same normalized key frame intervals by the modified key frame interval.

7. The system of claim 6, wherein the at least one processor is further configured to cause the system to perform additional operations including: determining whether at least two same normalized key frame intervals exist among the plurality of normalized key frame intervals; and in response to a determination that there is no same normalized key frame interval among the plurality of normalized key frame intervals, terminating the one or more iterations.

8. The system of claim 6, wherein to determine the delay time of the initial key frame for each of the plurality of video streams, the at least one processor is further configured to cause the system to perform additional operations including: determining, based on the plurality of updated normalized key frame intervals, a delay time of an initial key frame corresponding to each of the plurality of updated key frame intervals; for the at least two same normalized key frame intervals, determining a relative delay time of an initial key frame corresponding to each of the at least two same normalized key frame intervals; and determining, based on a delay time of an initial key frame corresponding to the modified key frame interval and the relative delay time of the corresponding initial key frame, a delay time of an initial key frame corresponding to each of the at least two same normalized key frame intervals.

9. The system of claim 1, wherein the at least one processor is further configured to cause the system to perform additional operations including
receiving, from the client terminal, a user request to pull the plurality of video streams.

10. The system of claim 1, wherein to process the plurality of video streams, the at least one processor is further configured to perform additional operations including at least one of: recoding at least one of the plurality of video streams; adding a key frame in at least one of the plurality of video streams; or postponing transmission of at least one of the plurality of video streams.

11. A method for a multi-video stream transmission to a client terminal implemented on a computing device having at least one processor, at least one computer-readable storage medium, and a communication platform connected to a network, the method comprising:
obtaining a multi-video stream including a plurality of video streams corresponding to a plurality of scenes captured by a plurality of cameras, each of the plurality of video streams including multiple key frames characterized by a frame rate and a key frame interval, a key frame interval of a video stream being a count of frames between two successive key frames in the video stream, wherein at least two frame rates of the plurality of video streams are different;
determining, based on a plurality of frame rates and a plurality of key frame intervals of the plurality of video streams, a delay time of an initial key frame for each of the plurality of video streams by:
(i) normalizing, based on the plurality of frame rates and the plurality of key frame intervals, the plurality of key frame intervals to generate a plurality of normalized key frame intervals, and
(ii) determining, based on the plurality of normalized key frame intervals, the delay time of the initial key frame for each of the plurality of video streams;
processing, based on the delay time of the initial key frame in each of the plurality of video streams, the plurality of video streams to determine a desired sending time of the initial key frame in the corresponding video streams, the desired sending time of the initial key frame in a video stream corresponding to a time when the initial key frame of the video stream is sent to the client terminal; and
transmitting, to the client terminal, the plurality of processed video streams.

12. The method of claim 11, wherein normalizing the plurality of key frame intervals comprising: determining, based on the plurality of corresponding frame rates, a plurality of key frame interval times corresponding to the plurality of key frame intervals, a key frame interval time being a time between the transmission of two successive key frames; determining a reference time based on the plurality of frame rates; and determining, based on the plurality of key frame interval times and the reference time, the plurality of normalized key frame intervals.

13. The method of claim 12, wherein determining the delay time of the initial key frame for each of the plurality of video streams comprising: determining a greatest common divisor (GCD) of the plurality of normalized key frame intervals; and determining, based on the reference time and the GCD of the plurality of normalized key frame intervals, the delay time of the initial key frame for each of the plurality of video streams.

14. The method of claim 13, wherein determining the delay time of the initial key frame for each of the plurality of video streams comprising: determining a lowest common multiple (LCM) of the plurality of normalized key frame intervals; and determining, based on the reference time, the GCD, and the LCM of the plurality of normalized key frame intervals, the delay time of the initial key frame for each of the plurality of video streams.

15. The method of claim 11, wherein to determine the delay time of the initial key frame for each of the plurality of video streams comprising: ranking the plurality of normalized key frame intervals according to a predetermined rule; and determining, based on the ranking, the delay time of the initial key frame for each of the plurality of video streams.

16. The method of claim 11, further comprising: performing one or more iterations, each of the one or more iterations including: determining whether at least two same normalized key frame intervals exist among the plurality of normalized key frame intervals; in response to a determination that at least two same normalized key frame intervals exist, determining a modified key frame interval based on the at least two same normalized key frame intervals; and updating the plurality of normalized key frame intervals by replacing at least one of the at least two same normalized key frame intervals by the modified key frame interval; or in response to a determination that there is no same normalized key frame interval among the plurality of normalized key frame intervals, terminating the one or more iterations.

17. The method of claim 16, wherein determining the delay time of the initial key frame for each of the plurality of video streams comprising: determining, based on the plurality of updated normalized key frame intervals, a delay time of an initial key frame corresponding to each of the plurality of updated key frame intervals; for the at least two same normalized key frame intervals, determining a relative delay time of an initial key frame corresponding to each of the at least two same normalized key frame intervals; and determining, based on a delay time of an initial key frame corresponding to the modified key frame interval and the relative delay time of the corresponding initial key frame, a delay time of an initial key frame corresponding to each of the at least two same normalized key frame intervals.

18. A system for a multi-data stream transmission to a client terminal, the system comprising:
at least one storage device storing a set of instructions;
at least one processor in communication with the at least one storage device, wherein when executing the set of instructions, the at least one processor is configured to cause the system to perform operations including:
obtaining a multi-data stream including a plurality of data streams corresponding to a plurality of scenes captured by a plurality of cameras, each of the plurality of data streams including multiple high-volume frames characterized by a frame rate and a high-volume frame interval, a high-volume frame interval of a data stream being a count of frames between two successive high-volume frames in the data stream, wherein at least two frame rates of the plurality of data streams are different;
determining, based on a plurality of frame rates and a plurality of high-volume frame intervals of the plurality of data streams, a delay time of an initial high-volume frame for each of the plurality of data streams by:
(i) normalizing, based on the plurality of frame rates and the plurality of key frame intervals, the plurality of key frame intervals to generate a plurality of normalized key frame intervals, and (ii) determining, based on the plurality of normalized key frame intervals, the delay time of the initial key frame for each of the plurality of video streams; processing, based on the delay time of the initial high-volume frame in each of the plurality of data streams, the plurality of data streams to determine a desired sending time of the initial high-volume frame in the corresponding data streams, the desired sending time of the initial high-volume frame in a data stream corresponding to a time when the initial high-volume frame of the data stream is sent to the client terminal; and transmitting, to the client terminal, the plurality of processed data streams.

* * * * *